(12) United States Patent
Baur et al.

(10) Patent No.: US 12,545,183 B2
(45) Date of Patent: Feb. 10, 2026

(54) VEHICULAR ELECTROCHROMIC REARVIEW MIRROR ASSEMBLY

(71) Applicant: Magna Mirrors of America, Inc., Holland, MI (US)

(72) Inventors: Michael J. Baur, Kentwood, MI (US); Zhenzhou Ma, Shanghai (CN)

(73) Assignee: Magna Mirrors of America, Inc., Holland, MI (US)

( * ) Notice: Subject to any disclaimer, the term of this patent is extended or adjusted under 35 U.S.C. 154(b) by 426 days.

(21) Appl. No.: 18/318,163

(22) Filed: May 16, 2023

(65) Prior Publication Data
US 2023/0373394 A1 Nov. 23, 2023

Related U.S. Application Data

(60) Provisional application No. 63/364,835, filed on May 17, 2022.

(51) Int. Cl.
*B60R 1/08* (2006.01)
*B60R 1/04* (2006.01)
*G02F 1/1333* (2006.01)
*G02F 1/153* (2006.01)

(52) U.S. Cl.
CPC ............... *B60R 1/088* (2013.01); *B60R 1/04* (2013.01); *G02F 1/133302* (2021.01); *G02F 1/153* (2013.01)

(58) Field of Classification Search
CPC ..... B60R 1/088; B60R 1/04; G02F 1/133302; G02F 1/153; G02F 1/155
See application file for complete search history.

(56) References Cited

U.S. PATENT DOCUMENTS

| 4,712,879 A | 12/1987 | Lynam et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,406,414 A | 4/1995 | O'Farrell et al. |
| 5,525,264 A | 6/1996 | Cronin et al. |
| 5,567,360 A | 10/1996 | Varaprasad et al. |

(Continued)

*Primary Examiner* — Tuyen Tra
(74) *Attorney, Agent, or Firm* — HONIGMAN LLP

(57) ABSTRACT

A vehicular electrochromic rearview mirror assembly includes a mounting structure and a mirror head. The mirror head accommodates an electrochromic mirror reflective element including front and rear glass substrates and an electrochromic medium disposed therebetween. The medium conductively contacts a transparent conductive coating at a second side of the front substrate and a conductive coating at a third side of the rear substrate. A conductive connector is disposed at a fourth side of the rear substrate and conductively connects to a conductive material along a perimeter region of the second side and the conductive coating at the third side. The perimeter region extends beyond an outer peripheral edge of the rear substrate. The conductive material is established in a zigzag pattern along the perimeter region so portions of the zigzag pattern are inboard and other portions are outboard of the edge of the rear substrate.

23 Claims, 5 Drawing Sheets

(56) References Cited

U.S. PATENT DOCUMENTS

| | | | |
|---|---|---|---|
| 5,610,756 | A | 3/1997 | Lynam et al. |
| 5,668,663 | A | 9/1997 | Varaprasad et al. |
| 5,724,187 | A | 3/1998 | Varaprasad et al. |
| 5,798,688 | A | 8/1998 | Schofield |
| 5,910,854 | A | 6/1999 | Varaprasad et al. |
| 6,002,511 | A | 12/1999 | Varaprasad et al. |
| 6,154,306 | A | 11/2000 | Varaprasad et al. |
| 6,178,034 | B1 | 1/2001 | Allemand et al. |
| 6,690,268 | B2 | 2/2004 | Schofield et al. |
| 7,184,190 | B2 | 2/2007 | McCabe et al. |
| 7,195,381 | B2 | 3/2007 | Lynam et al. |
| 7,255,451 | B2 | 8/2007 | McCabe et al. |
| 7,274,501 | B2 | 9/2007 | McCabe et al. |
| 7,289,037 | B2 | 10/2007 | Uken et al. |
| 7,360,932 | B2 | 4/2008 | Uken et al. |
| 7,626,749 | B2 | 12/2009 | Baur et al. |
| 8,049,640 | B2 | 11/2011 | Uken et al. |
| 8,277,059 | B2 | 10/2012 | McCabe et al. |
| 8,508,831 | B2 | 8/2013 | De Wind et al. |
| 8,529,108 | B2 | 9/2013 | Uken et al. |
| 8,730,553 | B2 | 5/2014 | De Wind et al. |
| 9,134,585 | B2 * | 9/2015 | Tonar ................ G02F 1/161 |
| 9,174,578 | B2 | 11/2015 | Uken et al. |
| 9,346,403 | B2 | 5/2016 | Uken et al. |
| 9,598,016 | B2 | 3/2017 | Blank et al. |
| 9,827,913 | B2 | 11/2017 | De Wind et al. |
| 2010/0085653 | A1 | 4/2010 | Uken et al. |
| 2024/0409028 | A1 | 12/2024 | Baur et al. |

\* cited by examiner

VEHICULAR ELECTROCHROMIC REARVIEW MIRROR ASSEMBLY

CROSS REFERENCE TO RELATED APPLICATION

The present application claims the filing benefits of U.S. provisional application Ser. No. 63/364,835, filed May 17, 2022, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. The mirror reflective element may comprise an electrochromic mirror reflective element comprising a front glass substrate and a rear glass substrate with an electrochromic medium sandwiched between the glass substrates and bounded by a perimeter seal.

SUMMARY OF THE INVENTION

A vehicular rearview mirror assembly includes a mirror head adjustably disposed at a mounting base configured to attach at an interior portion of a vehicle. The mirror head comprises an electrochromic mirror reflective element having (i) a front glass substrate having a first side and a second side separated from the first side by a thickness dimension of the front glass substrate and (ii) a rear glass substrate having a third side and a fourth side separated from the third side by a thickness dimension of the rear glass substrate. A mirror reflector is disposed at the rear glass substrate. The second side of the front glass substrate has a transparent electrically conductive coating disposed thereat, and the third side of the rear glass substrate has an electrically conductive coating disposed thereat. An electrochromic medium is disposed between the front glass substrate and the rear glass substrate and bounded by a perimeter seal. The electrochromic medium is in electrical conductive contact with (i) the transparent electrically conductive coating disposed at the second side of the front glass substrate and (ii) the electrically conductive coating disposed at the third side of the rear glass substrate. The electrochromic mirror reflective element comprises an electrically conductive connector disposed at the fourth side of the rear substrate, the electrically conductive connector being electrically conductively connected to an electrically conductive material disposed along a perimeter edge region of the second side of the front glass substrate and in electrically conductive connection with the electrically conductive coating disposed at the third side of the rear glass substrate. The electrically conductive material is established in a zigzag pattern along the perimeter edge region to provide a plurality of spaced apart gaps between the electrically conductive material and the rear glass substrate along the perimeter edge region.

These and other objects, advantages, purposes and features of the present invention will become apparent upon review of the following specification in conjunction with the drawings.

DESCRIPTION OF THE PREFERRED EMBODIMENTS

Figure 1:
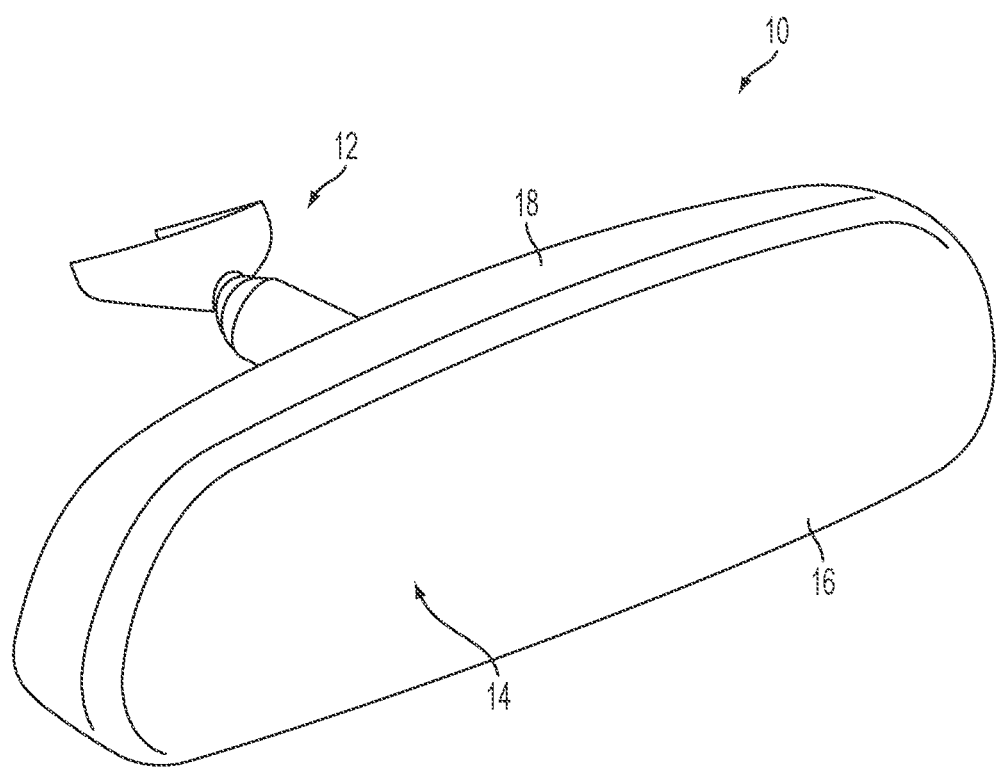
FIG. 1 is a perspective view of an interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a variable reflectance mirror reflective element that varies its reflectance responsive to electrical current applied to conductive coatings or layers of the reflective element.

Figure 2:
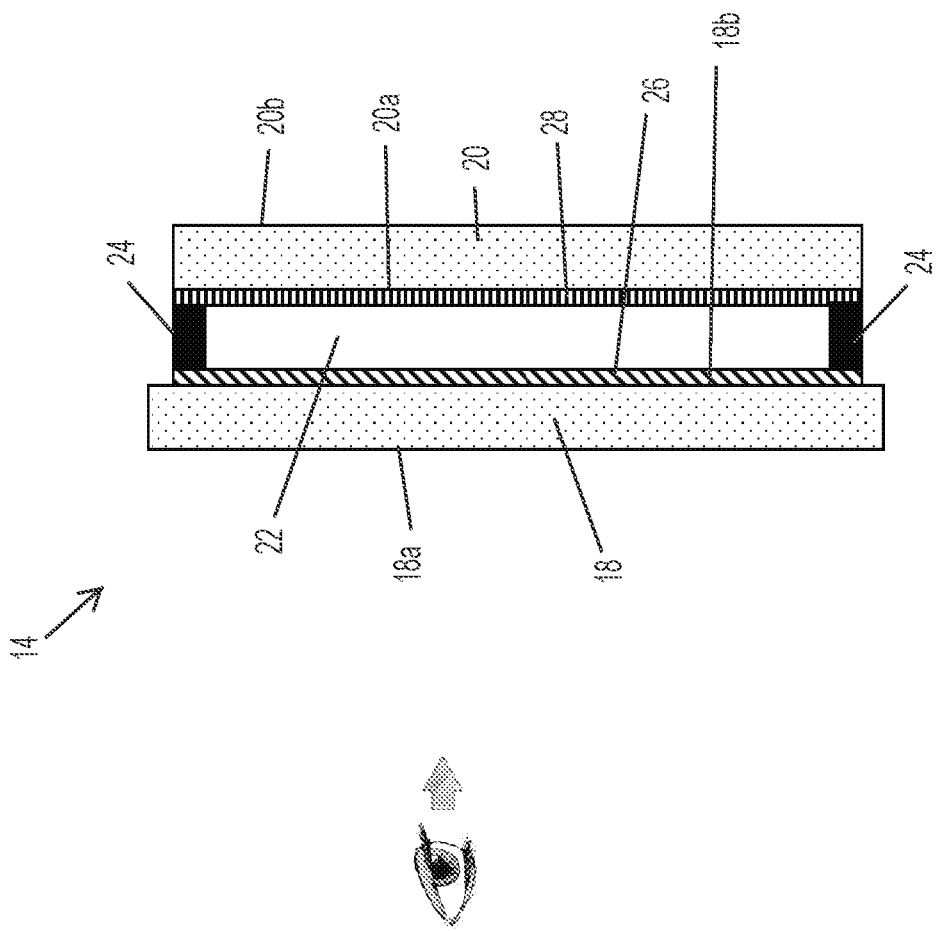
FIG. 2 is a sectional view of an electrochromic mirror reflective element of the mirror assembly of FIG. 1.

In the illustrated embodiment, and as shown in FIG. 2, the mirror reflective element 14 comprises a laminate construction variable reflectance electro-optic (such as electrochromic) reflective element assembly having a front glass substrate 18 and a rear glass substrate 20 with an electro-optic medium 22 (such as electrochromic medium) sandwiched therebetween and bounded by a perimeter seal 24. As shown in FIG. 2, the front substrate 18 has a front or first surface 18a (the surface that generally faces the driver of a vehicle when the mirror assembly is normally mounted at the vehicle) and a rear or second surface 18b opposite the front surface 18a, and the rear substrate 20 has a front or third surface 20a and a rear or fourth surface 20b opposite the front surface 20a, with the electro-optic medium 22 disposed between the second surface 18b and the third surface 20a and bounded by the perimeter seal 24 of the reflective element. The second surface 18a of the front substrate 18 has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (10) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20a of the rear substrate has a metallic reflector coating 28 (or multiple layers or coatings) established thereat. The front or third surface 20*a* of the rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective reflector coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (which may be referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (which may be referred to as the fourth surface of the reflective element).

The third surface 20*a* of the rear substrate defines the active EC area or surface of the rear substrate within the perimeter seal 24. The coated third surface 20*a* may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

The mirror assembly may comprise a frameless mirror assembly, where the front glass substrate may have an exposed rounded perimeter glass edge that provides a curved transition from the planar first surface of the front glass substrate to an outer less curved surface of the mirror casing (such as by utilizing aspects of the mirror assemblies described in U.S. Pat. Nos. 9,827,913; 9,174,578; 8,508,831; 8,730,553; 9,598,016 and/or 9,346,403, which are hereby incorporated herein by reference in their entireties). Optionally, the mirror assembly may include a casing portion that circumscribes the perimeter glass edge of the front glass substrate and provides the curved transition from the planar first surface of the front glass substrate to an outer less curved surface of the mirror casing, with the mirror casing portion not encroaching onto or overlapping the planar front or first surface of the front glass substrate (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties).

The third surface is electrified on the frameless mirror assembly by having a conductive coating that wraps around from the fourth surface of the rear substrate to the third surface of the rear substrate so that the electrical current can flow to the third surface coating from the fourth surface or rear side of the reflective element. The coating, although reliable, can be expensive and can require the part to go through two separate expensive coating processes.

Interaction of the main seal and the conductive epoxy includes a number of problems including solvent escape from one or the other that ends up creating voids in one material, the other material or both.

Figure 3:
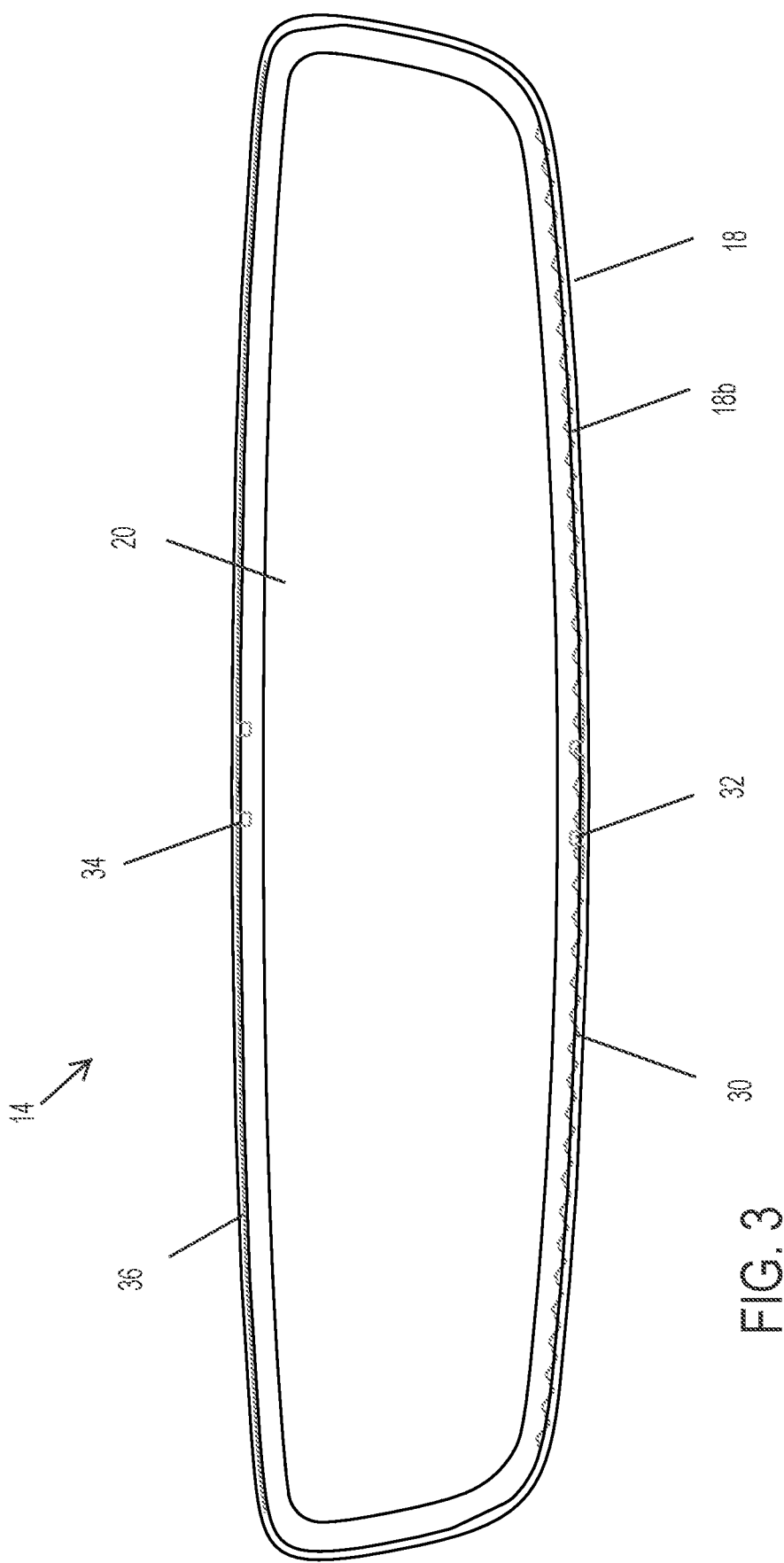
FIG. 3 is a plan view of the mirror reflective element.
Figure 4:
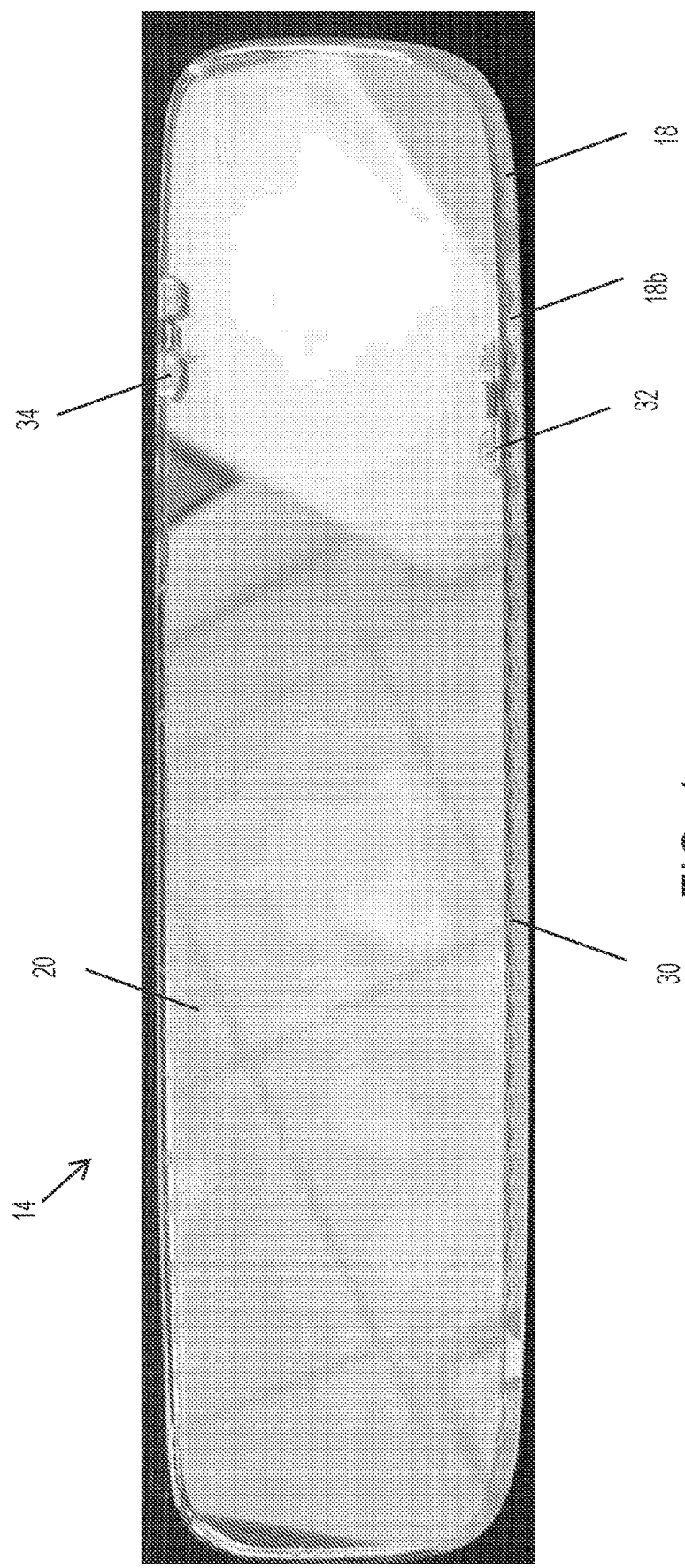
FIG. 4 is another plan view of the mirror reflective element.

As shown in FIGS. 3 and 4, an electrically conductive material 30 (e.g., an electrically conductive epoxy or other suitable electrically conductive material that provides electrical connection from an electrically conductive element 32 at the rear side or fourth surface of the rear glass substrate) is established in a zigzag or stitched or wavy pattern along a peripheral edge or perimeter edge region (such as along an upper or lower perimeter region) at the rear or second surface 18*b* of the front glass substrate 18. That is, the electrically conductive material 30 is established in a pattern comprising a series of short sharp turns, angles or alterations along the perimeter edge region. Put another way, the zigzag pattern of the electrically conductive material includes lines of electrically conductive material connected at respective ends to adjacent lines and angled relative to one another in an alternating fashion to form a continuous non-straight bead of material that extends along the perimeter edge region. The peripheral edge region of the front glass substrate extends at least partially beyond an outer edge of the rear glass substrate (i.e., the front glass substrate at least partially overlaps the edge of the rear glass substrate) so that the zigzag pattern of the electrically conductive material 30 disposed at the second surface of the front glass substrate alternatingly extends inboard of the outer edge of the rear glass substrate and outboard of the outer edge of the rear glass substrate.

By applying the conductive material in a "zigzag" or "stitched" or "wavy" pattern, the patterned electrically conductive material provides many small areas to vent solvent along the length of the conductive path. Thus, the electrically conductive material does not contact the rear substrate along the entirety of the perimeter region and has multiple gaps or spaces established between the conductive material and the rear glass substrate (as can be seen in FIGS. 3 and 4 by the peaks of the zigzags that are output of the edge of the rear glass substrate). This allows a "path of least resistance" for the solvents to vent externally thereby essentially eliminating the ability of any solvent bubbles to form. In situations where the zigzags do not extend beyond the perimeter edge of the rear substrate, they preferably are at least in close proximity to the perimeter edge, so that any pressure that may build up as the substrates are pressed together will take the path of least resistance and blow through the conductive material at points where the conductive material provides the thinnest wall thickness or barrier.

In addition, the pattern provides or allows for a uniform application of the electrical current to the electrically conductive coating(s) at the third surface to avoid any uneven coloring that may occur without symmetrical electrification. The electrically conductive connection to the transparent electrically conductive coating or layer at the second side or surface of the front glass substrate 18 may be made via another electrical connector 34 at the rear side of the mirror reflective element and an electrically conductive material 36 disposed along another perimeter edge region of the second surface of the front glass substrate.

Figure 6:
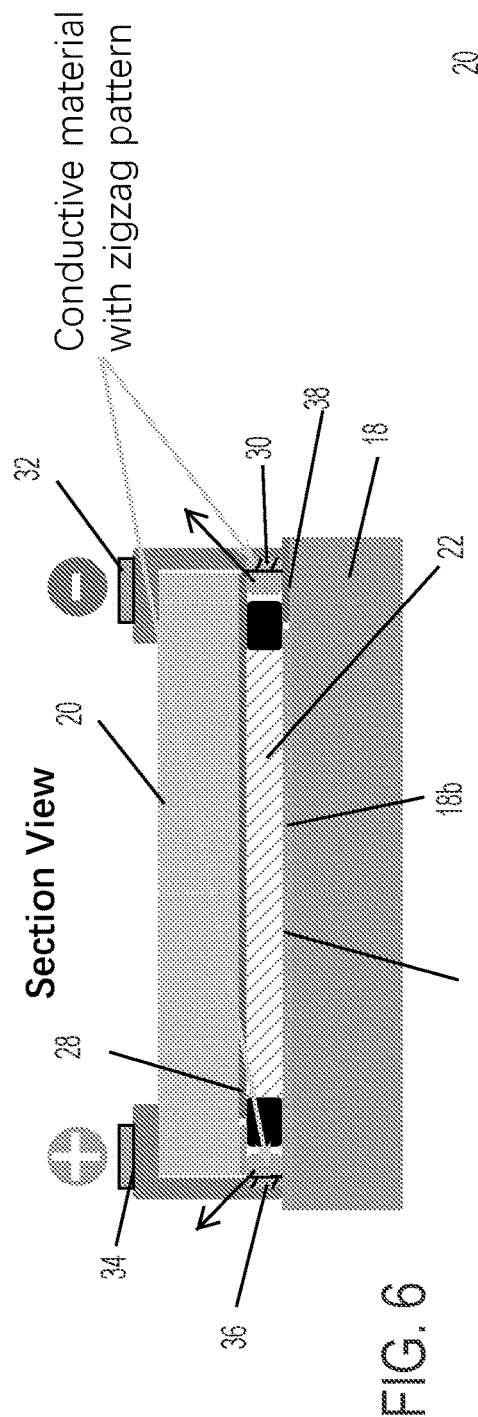
FIG. 6 is a sectional view of the mirror reflective element of FIG. 5.
Figure 5:
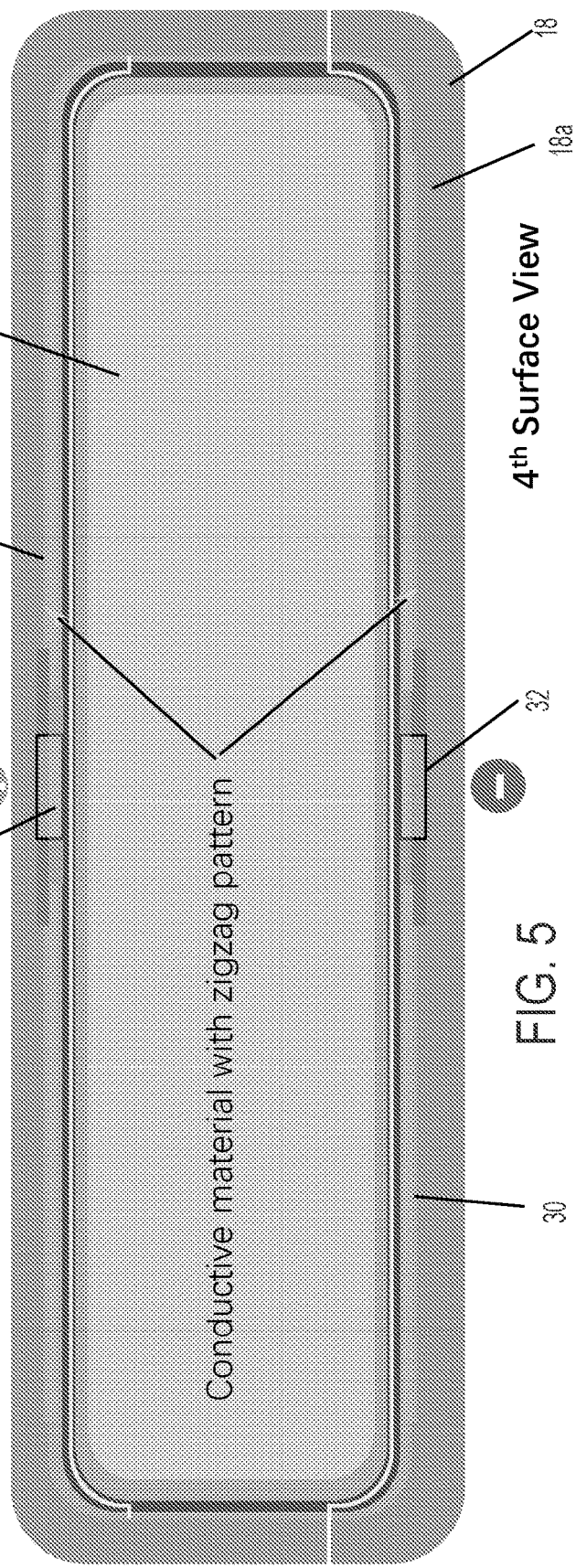
FIG. 5 is another plan view of the mirror reflective element.

As shown in FIGS. 5 and 6, the conductive material 30 may be disposed along one perimeter region (e.g., a lower perimeter region) so as to electrically conductively connect to the electrically conductive coating 28 at the rear substrate 20, while the conductive material 36 (which may also be established as a wavy or stitched or zigzag pattern) may be disposed along another perimeter region (e.g., an upper perimeter region) so as to electrically conductively contact the transparent electrically conductive coating 26 at the front substrate 18. As shown in FIG. 6, the conductive materials 30, 36 are disposed outboard of the seal 24 and part of the conductive materials span the spacing or gap between the glass substrates and part of the conductive materials extend outboard of the perimeter edge of the rear glass substrate (the cross-hatched part of the conductive materials 30, 36 in FIG. 6 is the part of the zigzag that is outboard of the rear glass substrate, and the arrows show the path of least resistance of air or solvent to escape at the zigzag patterns).

The substrate that does not have the respective conductive material electrically conductively connecting thereat has an electrically isolated region so that the conductive material electrically conductively connects to one of the conductive coatings and does not contact or electrify the other conductive coating. For example, the conductive material 30 electrically conductively connects between the electrical connector 32 and the coating 28 at the third surface of the rear substrate 20 and is disposed at an isolated coating or portion 38 at the second surface of the front substrate 18 that is electrically isolated from the transparent conductive coating 26. The conductive materials 30, 36 are disposed at an overhang region where the front substrate has a larger cross dimension than the rear substrate, and the electrical connectors 32, 34 extend from the rear side or fourth surface of the rear substrate and along a perimeter edge of the rear substrate to electrically conductively connect to the respective conductive material 30, 36.

Thus, the conductive materials 30, 36 are disposed as the zigzag pattern on the second surface of the front glass substrate. When the front and rear substrates are mated or joined together, the seal and the conductive materials (where the conductive materials extend inboard of the perimeter edge of the rear substrate) are compressed. With the substrates compressed, pressure within the cavity of the cell urges the seal outboard and may act against the conductive materials, and any pressurized air or solvents may cause pressure at the conductive beads or materials. Because of the zigzag pattern, the conductive beads or materials provide a plurality of small vents or passageways for air or solvents to escape, while providing continuous electrification along the respective perimeter regions of the substrates.

In other words, the first electric connector 32 is disposed at the fourth surface of the rear glass substrate 20 and the first electric connector 32 is electrically connected to the electrically conductive coating 28 at the third surface of the rear substrate 20 via the first portion of conductive material 30 that extends along a first perimeter region of the mirror reflective element (e.g., the lower perimeter region). Similarly, the second electric connector 34 is disposed at the fourth surface of the rear glass substrate 20 and the second electric connector 34 is electrically connected to the transparent electrically conductive coating 26 at the second surface of the front substrate 18 via the second portion of conductive material 36 that extends along a second perimeter region of the mirror reflective element (e.g., the upper perimeter region). The conductive materials 30, 36 are both disposed at the second surface of the front substrate 18 and extend between the front substrate 18 and the second substrate 20 outboard of the perimeter seal 24 of the mirror reflective element. The first portion of the electrically conductive material 30 is disposed along a coating or region 38 at the front glass substrate 18 that is electrically isolated from the transparent electrically conductive coating 26. Thus, the first portion of the electrically conductive material 30 is electrically isolated from the transparent electrically conductive coating 26 and the second portion of the electrically conductive material 36 is electrically isolated from the electrically conductive coating 28. The front glass substrate 18 may extend at least partially beyond an outer edge of the rear glass substrate 20, with at least a portion of the conductive material disposed along the front glass substrate 18 inboard of the outer edge of the rear glass substrate 20. The conductive material 30, 36 is disposed in the zigzag or wave pattern and thus extends back and forth between the front glass substrate and the rear glass substrate.

For mirror applications when the conductivity of the third surface may be reduced, such as to accommodate content (e.g., a camera and one or more light emitters, such as one or more near infrared light emitting diodes or the like) such as for a driver monitoring system (DMS) mirror, it may be difficult to obtain uniform electrification. Due to the lower conductivity of the third surface coating or coatings, uniform electrification would require a longer path of conductive material, which, without the zigzag or wavy material pattern, may be problematic. By providing the conductive material in the zigzag or wavy pattern, uniform electrification is achieved.

Although the second surface electrification material is not applied directly next to the main seal or under the glass, the wavy or zigzag material pattern may be applied in that manner in order to further reduce the width of the reflective band applied on the second surface.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

Although shown and described as an interior rearview mirror assembly mounted at an interior portion of a vehicle, aspects of the mirror assemblies described herein may be suitable for use in an exterior rearview mirror assembly mounted at an exterior side (such as at a door) of a vehicle.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or U.S. Publication No. US-2006-0050018, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,451; 6,504,531; 6,501,465; 6,492,980; 6,452,479; 6,437,258 and/or 6,369,804, which are hereby incorporated herein by reference in their entireties, and/or the like.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or International Publication No. WO 2022/150826, which are all hereby incorporated herein by reference in their entireties.

Optionally, the interior mirror assembly may comprise a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

Changes and modifications in the specifically described embodiments may be carried out without departing from the principles of the present invention, which is intended to be limited only by the scope of the appended claims as interpreted according to the principles of patent law.

The invention claimed is:

1. A vehicular electrochromic rearview mirror assembly, the vehicular electrochromic rearview mirror assembly comprising:
    a mounting structure configured to attach at an interior portion of a cabin of a vehicle equipped with the vehicular electrochromic rearview mirror assembly;
    a mirror head accommodating an electrochromic mirror reflective element;
    wherein, with the mounting structure attached at the interior portion of the cabin of the vehicle, the mirror head is adjustable by a driver of the vehicle to set a rearward view for the driver;
    wherein the electrochromic mirror reflective element comprises a front glass substrate having a first side and a second side separated from the first side by a thickness of the front glass substrate;
    wherein the electrochromic mirror reflective element comprises a rear glass substrate having a third side and a fourth side separated from the third side by a thickness of the rear glass substrate;
    wherein the front glass substrate extends beyond an outer peripheral edge of the rear glass substrate;
    wherein a mirror reflector is disposed at the rear glass substrate;
    wherein a transparent electrically conductive coating is disposed at the second side of the front glass substrate;
    wherein an electrically conductive coating is disposed at the third side of the rear glass substrate;
    wherein the electrochromic mirror reflective element comprises an electrochromic medium disposed between the front glass substrate and the rear glass substrate and bounded by a perimeter seal;
    wherein the electrochromic medium is in electrical conductive contact with the transparent electrically conductive coating disposed at the second side of the front glass substrate and with the electrically conductive coating disposed at the third side of the rear glass substrate;
    wherein an electrically conductive connector at the fourth side of the rear glass substrate is electrically conductively connected to an electrically conductive material that (i) is disposed along a first perimeter region of the second side of the front glass substrate that extends beyond a first portion of the outer peripheral edge of the rear glass substrate and (ii) is in electrically conductive connection with the electrically conductive coating disposed at the third side of the rear glass substrate; and
    wherein the electrically conductive material is established in a zigzag pattern along the first perimeter region of the second side of the front glass substrate, and wherein portions of the zigzag pattern are inboard of the first portion of the outer peripheral edge of the rear glass substrate and other portions of the zigzag pattern are outboard of the first portion of the outer peripheral edge of the rear glass substrate.

2. The vehicular electrochromic rearview mirror assembly of claim 1, wherein the mirror reflector is disposed at the third side of the rear glass substrate, and wherein the mirror reflector comprises the electrically conductive coating.

3. The vehicular electrochromic rearview mirror assembly of claim 1, wherein the mirror reflector is disposed at the fourth side of the rear glass substrate.

4. The vehicular electrochromic rearview mirror assembly of claim 1, wherein a second electrically conductive connector disposed at the fourth side of the rear glass substrate is electrically conductively connected to a second electrically conductive material that (i) is disposed along a second perimeter region of the second side of the front glass substrate that extends beyond a second portion of the outer peripheral edge of the rear glass substrate and (ii) is in electrically conductive connection with the transparent electrically conductive coating disposed at the second side of the front glass substrate.

5. The vehicular electrochromic rearview mirror assembly of claim 4, wherein the second electrically conductive material is established in a zigzag pattern along the second perimeter region of the second side of the front glass substrate.

6. The vehicular electrochromic rearview mirror assembly of claim 5, wherein portions of the zigzag pattern of the second electrically conductive material are inboard of the second portion of the outer peripheral edge of the rear glass substrate and other portions of the zigzag pattern are outboard of the second portion of the outer peripheral edge of the rear glass substrate.

7. The vehicular electrochromic rearview mirror assembly of claim 4, wherein the first portion of the outer peripheral edge is along an opposite edge of the rear glass substrate from the second portion of the outer peripheral edge of the rear glass substrate.

8. The vehicular electrochromic rearview mirror assembly of claim 4, wherein the first perimeter region of the second side of the front glass substrate is electrically isolated from the transparent electrically conductive coating disposed at the second side of the front glass substrate.

9. The vehicular electrochromic rearview mirror assembly of claim 4, wherein the second perimeter region of the second side of the front glass substrate is electrically isolated from the electrically conductive coating disposed at the third side of the rear glass substrate.

10. The vehicular electrochromic rearview mirror assembly of claim 1, wherein, during assembly of the electrochromic mirror reflective element, solvent escapes from inboard of the electrically conductive material to outboard of the electrochromic mirror reflective element via a plurality of spaced apart gaps between the electrically conductive material and the rear glass substrate along the first portion of the outer peripheral edge of the rear glass substrate.

11. The vehicular electrochromic rearview mirror assembly of claim 1, wherein the electrically conductive material comprises an electrically conductive epoxy.

12. A vehicular electrochromic rearview mirror assembly, the vehicular electrochromic rearview mirror assembly comprising:
  a mounting structure configured to attach at an interior portion of a cabin of a vehicle equipped with the vehicular electrochromic rearview mirror assembly;
  a mirror head accommodating an electrochromic mirror reflective element;
  wherein, with the mounting structure attached at the interior portion of the cabin of the vehicle, the mirror head is adjustable by a driver of the vehicle to set a rearward view for the driver;
  wherein the electrochromic mirror reflective element comprises a front glass substrate having a first side and a second side separated from the first side by a thickness of the front glass substrate;
  wherein the electrochromic mirror reflective element comprises a rear glass substrate having a third side and a fourth side separated from the third side by a thickness of the rear glass substrate;
  wherein the front glass substrate extends beyond an outer peripheral edge of the rear glass substrate;
  wherein a transparent electrically conductive coating is disposed at the second side of the front glass substrate;
  wherein an electrically conductive coating is disposed at the third side of the rear glass substrate;
  wherein a mirror reflector is disposed at the third side of the rear glass substrate;
  wherein the electrochromic mirror reflective element comprises an electrochromic medium disposed between the front glass substrate and the rear glass substrate and bounded by a perimeter seal;
  wherein the electrochromic medium is in electrical conductive contact with the transparent electrically conductive coating disposed at the second side of the front glass substrate and with the electrically conductive coating disposed at the third side of the rear glass substrate;
  wherein a first electrically conductive connector at the fourth side of the rear glass substrate is electrically conductively connected to a first electrically conductive material that (i) is disposed along a first perimeter region of the second side of the front glass substrate that extends beyond a first portion of the outer peripheral edge of the rear glass substrate and (ii) is in electrically conductive connection with the electrically conductive coating disposed at the third side of the rear glass substrate;
  wherein a second electrically conductive connector disposed at the fourth side of the rear glass substrate is electrically conductively connected to a second electrically conductive material that (i) is disposed along a second perimeter region of the second side of the front glass substrate that extends beyond a second portion of the outer peripheral edge of the rear glass substrate and (ii) is in electrically conductive connection with the transparent electrically conductive coating disposed at the second side of the front glass substrate; and
  wherein the first electrically conductive material and the second electrically conductive material are respectively established in respective zigzag patterns along the first perimeter region and the second perimeter region of the second side of the front glass substrate, and wherein portions of the respective zigzag patterns are inboard of the respective first and second portions of the outer peripheral edge of the rear glass substrate and other portions of the respective zigzag patterns are outboard of the respective first and second portions of the outer peripheral edge of the rear glass substrate.

13. The vehicular electrochromic rearview mirror assembly of claim 12, wherein the first portion of the outer peripheral edge is along an opposite edge of the rear glass substrate from the second portion of the outer peripheral edge of the rear glass substrate.

14. The vehicular electrochromic rearview mirror assembly of claim 12, wherein the first perimeter region of the second side of the front glass substrate is electrically isolated from the transparent electrically conductive coating disposed at the second side of the front glass substrate.

15. The vehicular electrochromic rearview mirror assembly of claim 12, wherein the second perimeter region of the second side of the front glass substrate is electrically isolated from the electrically conductive coating disposed at the third side of the rear glass substrate.

16. The vehicular electrochromic rearview mirror assembly of claim 12, wherein, during assembly of the electrochromic mirror reflective element, solvent escapes from inboard of the first electrically conductive material and the second electrically conductive material to outboard of the electrochromic mirror reflective element via a plurality of spaced apart gaps that are (i) between the first electrically conductive material and the rear glass substrate along the first portion of the outer peripheral edge of the rear glass substrate and (ii) between the second electrically conductive material and the rear glass substrate along the second portion of the outer peripheral edge of the rear glass substrate.

17. The vehicular electrochromic rearview mirror assembly of claim 12, wherein the first electrically conductive material and the second electrically conductive material comprises an electrically conductive epoxy.

18. A vehicular electrochromic rearview mirror assembly, the vehicular electrochromic rearview mirror assembly comprising:
  a mounting structure configured to attach at an interior portion of a cabin of a vehicle equipped with the vehicular electrochromic rearview mirror assembly;
  a mirror head accommodating an electrochromic mirror reflective element;
  wherein, with the mounting structure attached at the interior portion of the cabin of the vehicle, the mirror head is adjustable by a driver of the vehicle to set a rearward view for the driver;
  wherein the electrochromic mirror reflective element comprises a front glass substrate having a first side and a second side separated from the first side by a thickness of the front glass substrate;
  wherein the electrochromic mirror reflective element comprises a rear glass substrate having a third side and a fourth side separated from the third side by a thickness of the rear glass substrate;
  wherein the front glass substrate extends beyond an outer peripheral edge of the rear glass substrate;

wherein a mirror reflector is disposed at the fourth side of the rear glass substrate;

wherein a transparent electrically conductive coating is disposed at the second side of the front glass substrate;

wherein an electrically conductive coating is disposed at the third side of the rear glass substrate;

wherein the electrochromic mirror reflective element comprises an electrochromic medium disposed between the front glass substrate and the rear glass substrate and bounded by a perimeter seal;

wherein the electrochromic medium is in electrical conductive contact with the transparent electrically conductive coating disposed at the second side of the front glass substrate and with the electrically conductive coating disposed at the third side of the rear glass substrate;

wherein a first electrically conductive connector at the fourth side of the rear glass substrate is electrically conductively connected to a first electrically conductive material that (i) is disposed along a first perimeter region of the second side of the front glass substrate that extends beyond a first portion of the outer peripheral edge of the rear glass substrate and (ii) is in electrically conductive connection with the electrically conductive coating disposed at the third side of the rear glass substrate;

wherein a second electrically conductive connector disposed at the fourth side of the rear glass substrate is electrically conductively connected to a second electrically conductive material that (i) is disposed along a second perimeter region of the second side of the front glass substrate that extends beyond a second portion of the outer peripheral edge of the rear glass substrate and (ii) is in electrically conductive connection with the transparent electrically conductive coating disposed at the second side of the front glass substrate; and wherein the first electrically conductive material and the second electrically conductive material are respectively established in respective zigzag patterns along the first perimeter region and the second perimeter region of the second side of the front glass substrate, and wherein portions of the respective zigzag patterns are inboard of the respective first and second portions of the outer peripheral edge of the rear glass substrate and other portions of the respective zigzag patterns are outboard of the respective first and second portions of the outer peripheral edge of the rear glass substrate.

19. The vehicular electrochromic rearview mirror assembly of claim 18, wherein the first portion of the outer peripheral edge is along an opposite edge of the rear glass substrate from the second portion of the outer peripheral edge of the rear glass substrate.

20. The vehicular electrochromic rearview mirror assembly of claim 18, wherein the first perimeter region of the second side of the front glass substrate is electrically isolated from the transparent electrically conductive coating disposed at the second side of the front glass substrate.

21. The vehicular electrochromic rearview mirror assembly of claim 18, wherein the second perimeter region of the second side of the front glass substrate is electrically isolated from the electrically conductive coating disposed at the third side of the rear glass substrate.

22. The vehicular electrochromic rearview mirror assembly of claim 18, wherein, during assembly of the electrochromic mirror reflective element, solvent escapes from inboard of the first electrically conductive material and the second electrically conductive material to outboard of the electrochromic mirror reflective element via a plurality of spaced apart gaps that are (i) between the first electrically conductive material and the rear glass substrate along the first portion of the outer peripheral edge of the rear glass substrate and (ii) between the second electrically conductive material and the rear glass substrate along the second portion of the outer peripheral edge of the rear glass substrate.

23. The vehicular electrochromic rearview mirror assembly of claim 18, wherein the first electrically conductive material and the second electrically conductive material comprises an electrically conductive epoxy.

* * * * *